(12) United States Patent
Brown et al.

(10) Patent No.: US 6,696,519 B2
(45) Date of Patent: Feb. 24, 2004

(54) REDOX PROCESS FOR PREPARING EMULSION POLYMER HAVING LOW RESIDUAL MONOMER CONTENT

(75) Inventors: Steven Charles Brown, Elverson, PA (US); Ralph Craig Even, Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 229 days.

(21) Appl. No.: 09/965,438

(22) Filed: Sep. 27, 2001

(65) Prior Publication Data

US 2002/0068791 A1 Jun. 6, 2002

Related U.S. Application Data

(60) Provisional application No. 60/240,992, filed on Oct. 17, 2000.

(51) Int. Cl.$^7$ ................................. C08F 2/16
(52) U.S. Cl. ................ 524/804; 525/344; 526/234; 526/89; 526/90; 526/192
(58) Field of Search .................. 524/804; 526/234, 526/89, 90, 192; 525/344

(56) References Cited

U.S. PATENT DOCUMENTS

| 5,087,676 A | | 2/1992 | Heider et al. ................ 526/93 |
| 5,721,310 A | | 2/1998 | Sempio et al. ............... 524/556 |
| 5,756,574 A | * | 5/1998 | Baumstark et al. ......... 524/460 |
| 5,886,140 A | | 3/1999 | Olivares et al. ............ 528/485 |

FOREIGN PATENT DOCUMENTS

| EP | 1 021 685 A2 | 10/2001 |

* cited by examiner

*Primary Examiner*—William Cheung
(74) *Attorney, Agent, or Firm*—Ronald D. Bakule

(57) ABSTRACT

A process for preparing an aqueous emulsion polymer including providing at least one ethylenically unsaturated monomer and a free radical redox initiator system under emulsion polymerization conditions, the redox initiator system including a water-soluble oxidizing agent, a water-insoluble oxidizing agent, and a sulfinic acid, or salts thereof, reducing agent; and effecting the polymerization of at least some of the ethylenically unsaturated monomer is provided. Also provided is a process for reducing the residual ethylenically unsaturated monomer content of an aqueous emulsion polymer.

2 Claims, No Drawings

REDOX PROCESS FOR PREPARING EMULSION POLYMER HAVING LOW RESIDUAL MONOMER CONTENT

CROSS REFERENCE TO RELATED PATENT APPLICATIONS

This is a non-provisional application of prior U.S. provisional application Ser. No. 60/240,992 filed Oct. 17, 2000.

This invention relates to a redox process for preparing an emulsion polymer having low residual monomer content. Desirably, the redox process provides an emulsion polymer having low volatile organic compound content as well as low residual monomer content. More particularly, this invention relates to a process for preparing an aqueous emulsion polymer including providing at least one ethylenically unsaturated monomer and a free radical redox initiator system under emulsion polymerization conditions, the redox initiator system including a water-soluble oxidizing agent, an water-insoluble oxidizing agent, and a sulfinic acid, or salts thereof, reducing agent; and effecting the polymerization of at least some of the ethylenically unsaturated monomer. And the invention also relates to a process for reducing the residual monomer content of an emulsion polymer.

Redox initiator systems including at least one oxidizing agent and at least one reducing agent and, optionally, a metal promotor species are advantageously used in the emulsion polymerization of ethylenically unsaturated monomers, particularly if polymerization at temperatures lower than those at which conventional thermal initiation systems provide an effective level of free radical production such as at temperatures below 85° C. is desired. However, some redox initiator systems are less efficient for reducing monomer levels, particularly for reducing the levels of certain monomers, and for reducing total volatile organic compound content, particularly since some water-insoluble oxidizing agents must be provided as solutions in water-miscible solvents in order to be easily used in aqueous emulsion polymerizations. The present invention serves to provide redox emulsion polymerization processes which desirably lead to lowered residual monomer levels and/or lowered volatile organic compound levels when compared with processes using alternative redox initiator systems.

U.S. Pat. No. 5,087,676 discloses the preparation of polymers from olefinically unsaturated monmers using a free radical initiator system which is soluble and consists of an oxidizing agent, a reducing agent, an iron salt, and a vanadium salt.

U.S. Pat. No. 5,886,140 discloses a redox process to reduce residual monomer content at the end of an emulsion polymerization process using certain oxidizing agents and reducing agents selected from complexes of formol and zinc sulfoxylate, reducing sugars or their acid derivatives, and C5–C4 carboxylic acids.

A redox emulsion polymerization process which provides even lower residual monomer levels and/or lower volatile organic compound levels is still desired. It has now been surprisingly found that lowered residual monomer levels are found in emulsion polymerization of ethylenically unsaturated monomers when certain free radical redox initiator systems are used under emulsion polymerization conditions, the redox initiator systems including a water-soluble oxidizing agent, an water-insoluble oxidizing agent, and a sulfinic acid, or salts thereof, reducing agent. An improvement is found in reducing residual monomer at the end of a emulsion polymerization as well as in an emulsion polymerization itself.

In a first aspect of the present invention there is provided a process for preparing an aqueous emulsion polymer including providing at least one ethylenically unsaturated monomer and a free radical redox initiator system under emulsion polymerization conditions, the redox initiator system composed of a water-soluble oxidizing agent, an water-insoluble oxidizing agent, and a sulfinic acid, or salts thereof, reducing agent; and effecting the polymerization of at least some of the ethylenically unsaturated monomer.

In a second aspect of the present invention there is provided a process for reducing the residual ethylenically unsaturated monomer content of an aqueous emulsion polymer including contacting the aqueous emulsion polymer with a free radical redox initiator system, the redox initiator system composed of a water-soluble oxidizing agent, an water-insoluble oxidizing agent, and a sulfinic acid, or salts thereof, reducing agent; and effecting the polymerization of at least some of the residual ethylenically unsaturated monomer.

The process for preparing an aqueous emulsion polymer of this invention includes providing at least one ethylenically unsaturated monomer and a free radical redox initiator system under emulsion polymerization conditions.

The aqueous acrylic emulsion polymer contains, as copolymerized unit(s), at least one copolymerized monoethylenically-unsaturated (meth)acrylic monomer including esters, amides, and nitriles of (meth)acrylic acid, such as, for example, (meth)acrylic ester monomer including methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (methacrylate), N,N-dialkyl aminoalkyl (meth)acrylate; urieido (meth)acrylate; (meth)acrylonitrile and (meth)acrylamide; styrene or alkyl-substituted styrenes; butadiene; vinyl acetate, vinyl propionate, or other vinyl esters; vinyl monomers such as vinyl chloride, vinylidene chloride, and N-vinyl pyrollidone; allyl methacrylate, diallyl phthalate, 1,3-butylene glycol dimethacrylate, 1,6-hexanedioldiacrylate, and divinyl benzene; (meth)acrylic acid, crotonic acid, itaconic acid, sulfoethyl methacrylate, phosphoethyl methacrylate, fumaric acid, maleic acid, monomethyl itaconate, monomethyl fumarate, monobutyl fumarate, and maleic anhydride. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively.

The free radical addition polymerization techniques used to prepare the acrylic emulsion polymer of this invention are well known in the art. Conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer.

A redox initiator system composed of a water-soluble oxidizing agent, an water-insoluble oxidizing agent, and a sulfinic acid, or salts thereof, reducing agent is used. At least one sulfinic acid reducing agent, or salt thereof such as, for example, alkylsulfinic acids such as isopropyl sulfinic acid; aryl sulfinic acuds such as phenylsulfinic acid; and hydroxyalkyl sulfinic acids such as hydroxymethane sulfinic acid and 2-hydroxy-2-sulfinatoacetic acid and salts of the preceding acids typically at a level of 0.01% to 3.0%, preferably 0.01 to 0.5%, more preferably 0.025% to 0.25%, by weight based on monomer weight, is used. A preferred reducing agent is 2-hydroxy-2-sulfinatoacetic acid. Typically, 0.01% to 3.0%, preferably 0.02 to 1%, more preferably 0.05% to 0.5%, by weight based on monomer weight, of oxidizing agent is used. The oxidizing agent includes a water-soluble oxidizing agent such as, for example, hydrogen peroxide and ammonium or alkali metal persulfates, perborates, peracetates, peroxides, and percarbonates and a water-insoluble oxidizing agent such as, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. By "water-insoluble oxidizing agent" herein is meant an oxidizing agent which has a water solubility of less than 20% by weight in water at 25 C. Redox reaction catalyzing metal salts of iron, copper, manganese, silver, platinum, vanadium, nickel, chromium, palladium, or cobalt may optionally be used at a level of 0.01 to 25 ppm, with or without metal complexing agents. Preferably iron or copper may be used. More preferably, 0.01 to 10 ppm copper may be used.

The oxidant and reductant are typically added to the reaction mixture in separate streams, preferably concurrently with the monomer mixture. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

Further, a chain transfer agent such as, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate in an amount of 0.1 to 5.0% by weight based on monomer weight may be used. Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

However, at least some, preferably at least 40% by weight, more preferably at least 75% by weight, most preferably at least 95% by weight, based on dry polymer weight, of the emulsion polymer is formed using the redox initiator system composed of a water-soluble oxidizing agent, an water-insoluble oxidizing agent, and a sulfinic acid, or salts thereof, reducing agent in the absence of any other oxidizing agent and in the absence of any other reducing agent. The emulsion polymerization is contemplated to include embodiments where some of the polymer is introduced by a polymer seed, formed in situ or not, or formed during hold periods or formed during periods wherein the monomer feed has ended and residual monomer is being converted to polymer.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

The emulsion polymer has an average particle diameter from 20 to 1000 nanometers, preferably from 70 to 300 nanometers. Particle sizes herein are those determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as is taught in U.S. Pat. Nos. 5,340,858; 5,350,787; 5,352,720; 4,539,361; and 4,456,726.

The glass transition temperature ("Tg") of the emulsion polymer is typically from −60° C. to 100° C., preferably from −20° C. to 50° C., the monomers and amounts of the monomers selected to achieve the desired polymer Tg range are well known in the art. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers may be found, for example, in "Polymer Handbook", edited by J. Brandrup and E. H. Immergut, Interscience Publishers.

In the second aspect of the present invention there is provided a process for reducing the residual ethylenically unsaturated monomer content of a previously formed aqueous emulsion polymer including contacting the aqueous emulsion polymer with a free radical redox initiator system, the redox initiator system composed of a water-soluble oxidizing agent, an water-insoluble oxidizing agent, and a sulfinic acid, or salts thereof, reducing agent; and effecting the polymerization of at least some of the residual ethylenically unsaturated monomer. The emulsion polymer of this aspect includes compositions, Tg, and particle sizes as described and exemplified hereinabove, prepared with the redox initiator system of this invention or any other free radical initiator means such as, for example, by thermal initiation and photoinitiation having a residual ethylenically unsaturated monomer content. The residual ethylenically unsaturated monomer content will typically be less than 5%, preferably less than 1%, by weight based on polymer weight. The emulsion polymer is then contacted with a redox initiator system composed of a water-soluble oxidizing agent, an water-insoluble oxidizing agent, and a sulfinic acid, or salts thereof, reducing agent, in composition and amounts as described and exemplified herein above and the polymerization of at least some, preferably at least 50%, more preferably at least 90%, of the residual ethylenically unsaturated monomer is effected under conditions as described hereinabove.

The emulsion polymer of this invention and the emulsion polymer having reduced residual monomer of this invention may be used in paints, paper coatings, leather coatings, adhesives, nonwoven and paper saturants, and the like.

The following examples are presented to illustrate the invention and the results obtained by the test procedures.

Abbreviations

DI water=Deionized water
BA=butyl acrylate
MMA=methyl methacrylate
MAA=methacrylic acid Test Methods
Determination of BA and MMA Levels by GC Technique Hewlett Packard 5890 Series II Gas Chromatograph
Column: HP-Wax (Agilent/Hewlett-Packard) 30M Length, 0.32 mm ID, 0.5 um Film
Temperature Program (in ° C.)
Injector Temp. 180
Detector Temp. 250
Initial 45 for 5 min.—Rate 20/min to 245–hold 245 for 3 min.

Determination of Methacrylic Acid Level by Ion Exchange Chromatography

Perkin Elmer Series 200 Biocompatible Binary LC
Column: 30 cm×7.8 mm id Phenomenex Rezex ROA Sulfonated Styrene—DVB—7.5 micron
Column Oven Temperature: 35° C.
Flow Rate: 0.5 ml/min.
Column pressure: ~650 psi
Mobile Phase: 5 mM $H_3PO_4$
Detector wavelength: 210 nanometers
Injection volume: 15 microliters Calculation of Volatile Organic Compound (VOC) Content
Total VOC=ppm butyl acrylate+ppm methyl methacrylate+ppm methacrylic acid+ppm VOC from t-butyl hydroperoxide. Calculation of VOC from t-butyl hydroperoxide assumes 90% of t-butyl hydroperoxide results in formation of t-butanol and acetone. Residuals of butyl acrylate and methyl methacrylate below 20 ppm (minimum level of quantitation for the GC technique for residual monomers) treated as 0 ppm.

EXAMPLE
Preparation of Emulsion Polymer A
An acrylic emulsion polymer (BA/MMA/MAA) was prepared with residual levels of about 3000 ppm each BA and MMA and about 2000 ppm MAA. The latex had polymer solids=44%, contained 5 ppm iron and was at pH 6.1. (pH was determined with an Orion model 230A pH meter fitted with an Orion model 82-72 electrode calibrated with pH 4 and 7 buffers).

Comparative Example A
Reduction of Residual Monomer
500 g Emulsion Polymer A was heated to 55° C. in a multi-neck round bottom flask fitted with mechanical stirring under a nitrogen blanket. A 5 g sample of latex was added to 5 g 0.2% 4-hydroxy TEMPO solution in deionized water. A solution of 0.34 g ammonium persulfate and 0.19 g 70% t-butyl hydroperoxide (0.0030 moles total oxidizing agent) in 12.5 g DI water was fed to the latex over 40 minutes. A solution of 0.19 g iso-ascorbic acid (0.0011 moles reducing agent) in 12.5 g DI water was simultaneously fed to the latex. 20 minutes after completion of the feeds a 5 g sample of latex was added to 5 g 0.2% 4-hydroxy TEMPO solution in DI water.

Example 1
Reduction of Residual Monomer
The procedure of Comparative Example A was followed with the exception that iso-ascorbic acid was replaced with 0.23 g 2-hydroxy-2-sulfinatoacetic acid (50% by weight sulfinic acid sodium salt; 0.0011 moles reducing agent).

Example 2
Reduction of Residual Monomer
The procedure of Example 1 was followed with the exception that 2 ppm copper (as a 0.1% solution of copper nitrate hemipentahydrate) was added to the emulsion polymer prior to commencing the oxidizing agent and reducing agent feeds.

Comparative Example B

Reduction of Residual Monomer
The procedure of Example 1 was followed with the exception that the total oxidizing agent feed was 0.38 g 70% t-butyl hydroperoxide (0.0030 moles total oxidizing agent) in 12.5 g DI water.

TABLE

VOC and Residual Monomer Results for Examples 1–2 and Comp. Ex. A–B

|  | Residual BA | Residual MMA | Residual MAA | VOC (calc.) |
|---|---|---|---|---|
| Emulsion Polymer A used in Comp. Ex. A before redox treatment | 3428 ppm | 3093 ppm | 2064 ppm |  |
| Comp. Ex. A | 392 ppm | 36 ppm | 1323 ppm | 1966 ppm |
| Emulsion Polymer A used in Example 1 | 3582 ppm | 3200 ppm | 2075 ppm |  |
| Example 1 | <20 ppm | <20 ppm | 820 ppm | 1045 ppm |
| Emulsion Polymer A used in Example 2 | 3399 ppm | 3072 ppm | 2063 ppm |  |
| Example 2 | <20 ppm | <20 ppm | 1005 ppm | 1230 ppm |
| Emulsion Polymer A used in Comp. Ex. B | 3375 ppm | 2971 ppm | 2246 ppm |  |
| Comp. Ex. B | <20 ppm | <20 ppm | 1066 ppm | 1516 ppm |

The process for reducing the residual ethylenically unsaturated monomer content of an aqueous emulsion polymer of Examples 1–2 of this invention is substantially more effective in reducing the residual monomer level and is substantially more effective in reducing VOC content than the process of Comparative Example A. The process for reducing the residual ethylenically unsaturated monomer content of an aqueous emulsion polymer of Examples 1–2 of this invention is substantially as effective in reducing the residual monomer level and is substantially more effective in reducing VOC content than the process of Comparative Example B.

What is claimed is:

1. A process for preparing an aqueous emulsion polymer comprising providing at least one ethylenically unsaturated monomer and a free radical redox initiator system under emulsion polymerization conditions, said redox initiator system comprising a water-soluble oxidizing agent, a water-insoluble oxidizing agent, and a reducing agent selected from the group consisting of 2-hydroxy-2-sulfinatoacetic acid and salts thereof; and effecting the polymerization of at least some of said ethylenically unsaturated monomer.

2. A process for reducing the residual ethylenically unsaturated monomer content of an aqueous emulsion polymer comprising contacting said emulsion polymer with a free radical redox initiator system, wherein said redox initiator system comprises a water-soluble oxidizing agent, a water-insoluble oxidizing agent, and a reducing agent is selected from the group consisting of 2-hydroxy-2-sulfinatoacetic acid and salts thereof; and effecting the polymerization of at least some of said residual ethylenically unsaturated monomer.

* * * * *